United States Patent [19]

Yamano et al.

[11] Patent Number: 4,685,060
[45] Date of Patent: Aug. 4, 1987

[54] METHOD OF TRANSLATION BETWEEN LANGUAGES WITH INFORMATION OF ORIGINAL LANGUAGE INCORPORATED WITH TRANSLATED LANGUAGE TEXT

[75] Inventors: Fumiyuki Yamano, Kawasaki; Atsushi Okajima, Yokohama, both of Japan

[73] Assignee: Hitachi, Ltd., Tokyo, Japan

[21] Appl. No.: 662,850

[22] Filed: Oct. 19, 1984

[30] Foreign Application Priority Data

Oct. 21, 1983 [JP] Japan ................. 58-195989

[51] Int. Cl.[4] ............................. G06F 15/38
[52] U.S. Cl. ................... 364/419; 364/900
[58] Field of Search ............ 364/419, 200 MS File, 364/900 MS File; 434/167, 157, 169, 176

[56] References Cited

U.S. PATENT DOCUMENTS

| | | | |
|---|---|---|---|
| 4,158,236 | 6/1979 | Levy | 364/900 |
| 4,439,836 | 3/1984 | Yoshida | 364/900 |
| 4,475,171 | 10/1984 | Kanou | 364/900 |
| 4,502,128 | 2/1985 | Okajima et al. | 364/900 |
| 4,507,734 | 3/1985 | Kaldas | 364/419 |
| 4,507,750 | 3/1985 | Frantz et al. | 364/900 |
| 4,543,631 | 9/1985 | Kvrosv | 364/200 |
| 4,551,818 | 11/1985 | Sado et al. | 364/900 |

*Primary Examiner*—Gary V. Harkcom
*Attorney, Agent, or Firm*—Antonelli, Terry & Wands

[57] ABSTRACT

In a method of translating a text described by a first language into a text described by a second language, words/idioms appearing in the first language text are managed as data sorted in accordance with a predetermined order, in such a manner that individual identification numbers are provided to the words/idioms in accordance with the predetermined order of sorting while the same identification number is provided to the same word/idiom. Then, the identification numbers as well as character strings of the second language corresponding to the words/idioms of the first language are used to generate the second language text in which the identification numbers for the words/idioms of the first language corresponding to the character strings of the second language are added ahead of the respective character strings of the second language. When it is desired to replace some of the character strings in the second language text in editing the second language text, the incorporation of the identification numbers into the second language text makes it possible to check the matching in the first language text by means of the identification numbers, thereby preventing unnecessary or undersired replacement which may be produced if the edition is made on the basis of only the matching of the character strings in the second language text.

3 Claims, 15 Drawing Figures

---

SENTENCE KEY

ENGLISH TEXT | My father studied economics, but he is not economical. The Economic Planning Agency said there were much more economical men in these days.

JAPANESE TEXT | ⑬私の ⑥父は ④ 経済学を ⑰ 学んだが ⑦彼は ⑤ 経済的でない. ⑪ 経済企画庁によれば ② 最近 ⑤ 経済的な ⑩ 人が多くなりつつあるそうだ.

| SENTENCE KEY | |
|---|---|
| ENGLISH TEXT | My father studied economics, but he is not economical. The Economic Planning Agency said there were much more economical men in these days. |
| JAPANESE TEXT | ⑬私の ⑥父は ④経済学を ⑰学んだが, ⑦彼は ⑤経済的でない。 ①経済企画庁によれば ②最近 ⑤経済的な ⑩人が多くなりつつあるそうだ。 |

| # | WORD |
|---|---|
| 1 | agency |
| 2 | but |
| 3 | day |
| 4 | economics |
| 5 | economical |
| 6 | father |
| 7 | he |
| 8 | in |
| 9 | is |
| 10 | men |
| 11 | more |
| 12 | much |
| 13 | my |
| 14 | not |
| 15 | planning |
| 16 | said |
| 17 | study |
| 18 | the |
| 19 | there |
| 20 | these |
| 21 | were |

(b)

| # | IDIOM |
|---|---|
| 1 | Economical Planning Agency |
| 2 | in these days |

FIG. 4

| 1 H | 2 E | 3 | 4 W | 5 R | 6 O | 7 T | 8 E | 9 | 10 E | 11 N |
|---|---|---|---|---|---|---|---|---|---|---|
| 12 G | 13 L | 14 I | 15 S | 16 H | 17 | 18 V | 19 E | 20 R | 21 Y | 22 |
| 23 S | 24 L | 25 O | 26 W | 27 L | 28 Y | 29 | 30 | 31 B | 32 U | 33 T |
| 34 | 35 H | 36 E | 37 | 38 L | 39 I | 40 K | 41 E | 42 D | 43 | 44 T |
| 45 O | 46 | 47 S | 48 T | 49 U | 50 D | 51 Y | 52 | 53 T | 54 O | 55 |
| 56 R | 57 E | 58 A | 59 D | 60 | 61 A | 62 N | 63 D | 64 | 65 W | 66 R |
| 67 I | 68 T | 69 E | 70 | 71 I | 72 N | 73 | 74 E | 75 N | 76 G | 77 L |
| 78 I | 79 S | 80 H | 81 | 82 A | 83 T | 84 | 85 S | 86 C | 87 H | 88 O |
| 89 O | 90 L | 91 . | 92 (END) | | | | | | | |

| SE-QUENCE | PART OF SPEECH PATTERN TO BE SEGMENTED AS PHRASAL ELEMENT | | | | | PART OF SPEECH TO BE ASSIGNED TO PHRASAL ELEMENT |
|---|---|---|---|---|---|---|
| 1 | ADV | --- | ADV | | | ADV |
| 2 | PREP | N | --- | N | | PRENAL |
| 3 | AUX | --- | AUX | V | | V |
| 4 | AUX | NOT | V | | | V |
| 5 | TO | V | | | | TOV |
| 6 | V | AND | V | | | V |

FIG. 9

| | NS(1) | NS(2) | NS(3) | NS(21) | | NS(6) NS(7) | NS(8) | NS(9) | NS(22) | NS(24) | NS(25) | NS(26) | NS(20) |
|---|---|---|---|---|---|---|---|---|---|---|---|---|---|
| *11 | | HE | WROTE | ENGLISH | VERY SLOWLY | , | BUT | HE | LIKED | TO STUDY | TO READ AND WRITE | IN ENGLISH | AT SCHOOL | . |
| *12 | | W | W | W | P | W | W | W | W | P | P | P | P | W |
| *13 | | PRN | V7 | N | ADV | COM | CNJ | PRN | V6 | TO V6 | TO V7 | PRENAL | PRENAL | PRD |
| *14 | | SUBJ | GOV | OBJ | PENDM | DEL | BUT | SUBJ | GOV | TO GOV | TO OBJ | PEVOM | PENDM | DEL |

ENGLISH TEXT
My father studied economics, but he is not economical. The Economical Planning Agency said there were much more economical men in these days.

JAPANESE TEXT
私の父は経済学を学んだが、彼は経済的でない。経済企画庁によれば最近経済的な人が多くなりつつあるようだ。

(b)

ENGLISH TEXT
My father studied economics, but he is not economical. The Economical Planning Agency said there were much more economical men in these days.

JAPANESE TEXT
私の父は経済学を学んだが、彼は経済的でない。経済企画庁によれば最近経済的な人が多くなりつつあるようだ。

(c)

ENGLISH TEXT
My father studied economics, but he is not economical. The Economical Planning Agency said there were much more economical men in these days.

JAPANESE TEXT
私の父は経済学を学んだが、彼は経済的でない。経済企画庁によれば最近経済的な人が多くなりつつあるようだ。

REPLACEMENT CHARACTER STRING：実利

(d)

ENGLISH TEXT
My father studied economics, but he is not economical. The Economical Planning Agency said there were much more economical men in these days.

JAPANESE TEXT
私の父は経済学を学んだが、彼は実利的でない。経済企画庁によれば最近実利的な人が多くなりつつあるようだ。

METHOD OF TRANSLATION BETWEEN LANGUAGES WITH INFORMATION OF ORIGINAL LANGUAGE INCORPORATED WITH TRANSLATED LANGUAGE TEXT

BACKGROUND OF THE INVENTION

1. Field of the Invention

The present invention relates to a method of translation from a first language to a second language and more particularly to an editing method of a text of the second language.

2. Description of the Prior Art

In the past, a text written in a natural language has been edited by various types of editing systems such as a general purpose terminal device and a word processor.

Figure 1:
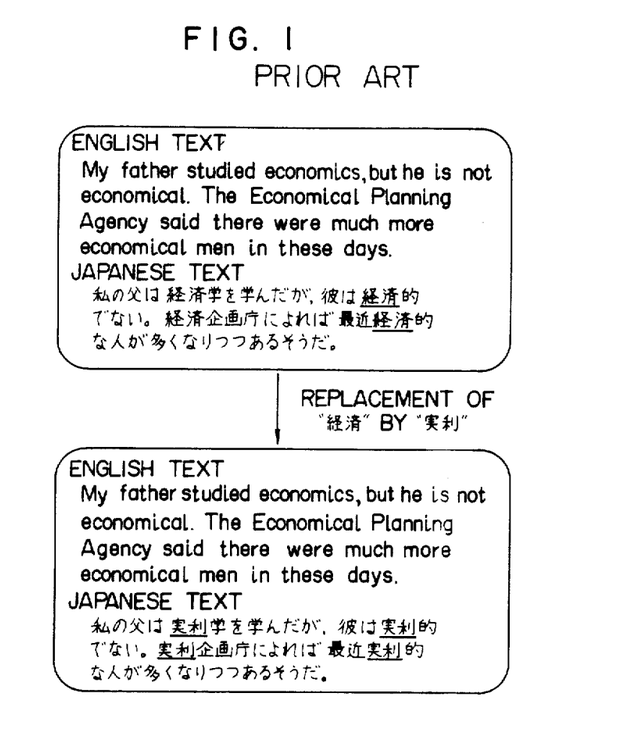
FIG. 1 illustrates character string replacement processing by a known technique.

In such editing systems, the language for processing is limited to one. That is, when an English text is to be processed, the word processing function operates as an English word processor, and when a Japanese text is to be processed, it operates as a Japanese word processor. However, when a Japanese text is in a process of translation from English to Japanese, that is, when a translated text is to be edited, if only the Japanese word processing function is used, the translated text is regarded as mere text character strings. Accordingly, if processing for replacing character strings over the entire text is carried out, portions which are not to be replaced are also processed as shown in FIG. 1. It is very inconvenient in converting the text to a correct translated text.

SUMMARY OF THE INVENTION

It is an object of the present invention to provide a character string replacement system which is effective iin editing a translated text in translation processing.

In accordance with the present invention, in a translation processing machine for translating a first language to a second language, information in the first language is stored as data in a second language text for each character string which is a unit of translation.

In order to attain the above object, in accordance with the present invention, there is provided a method of translation in which a correspondence relation between a first language text and a second language text translated by translation processing is stored as data for each unit of translation, such as word, phrase or idiom, so that when the replacement of character strings in the second language text is effected, the matching with the corresponding character string in the first language text is checked for each character string to determine if it can be translated.

BRIEF DESCRIPTION OF THE DRAWINGS

FIG. 13 a and b are a flow chart showing a processing flow in one embodiment of the present embodiment.

DESCRIPTION OF THE PREFERRED EMBODIMENTS

Figure 2:
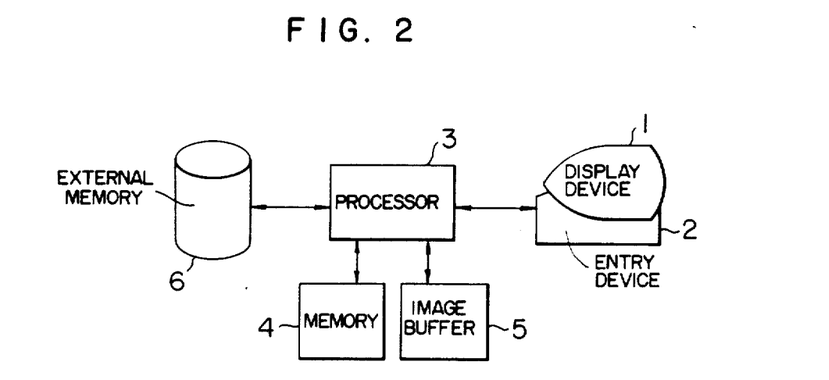
FIG. 2 is a block diagram of one embodiment of the present invention.

FIG. 2 is a block diagram of one embodiment of a character editing processing system of the present invention. Numeral 1 denotes a display device, numeral 2 denotes an entry device such as a keyboard, numeral 3 denotes a processor, numeral 4 denotes a memory, numeral 5 denotes an image buffer, and numeral 6 denotes an external memory such as a magnetic disc. In the present embodiment, for the sake of convenience of explanation, a first language is English and a second language is Japanese, and an edit processing of Japanese text in the English-to-Japanese translation processing is explained.

Figure 3:
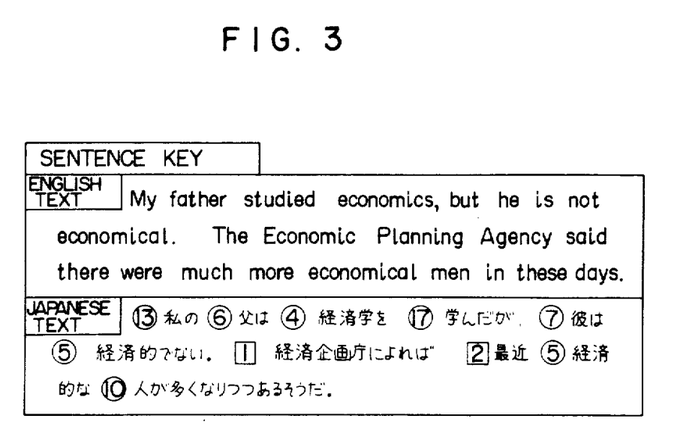
FIG. 3 shows a storage format of a translation data in the present invention.

As shown in FIG. 3, an English text and a translated text translated from English to Japanese by a system disclosed in Japanese Patent Application Laid-Open No. 58-40684 (corresponding to U.S. application Ser. No. 415,601, filed Sept. 7, 1982) are stored in pair in the external memory 6 and they can be read out by a sentence key.

An outline of preparation of the translated text disclosed in the Japanese Patent Application Laid-Open No. 58-40684 is explained.

Figure 4:
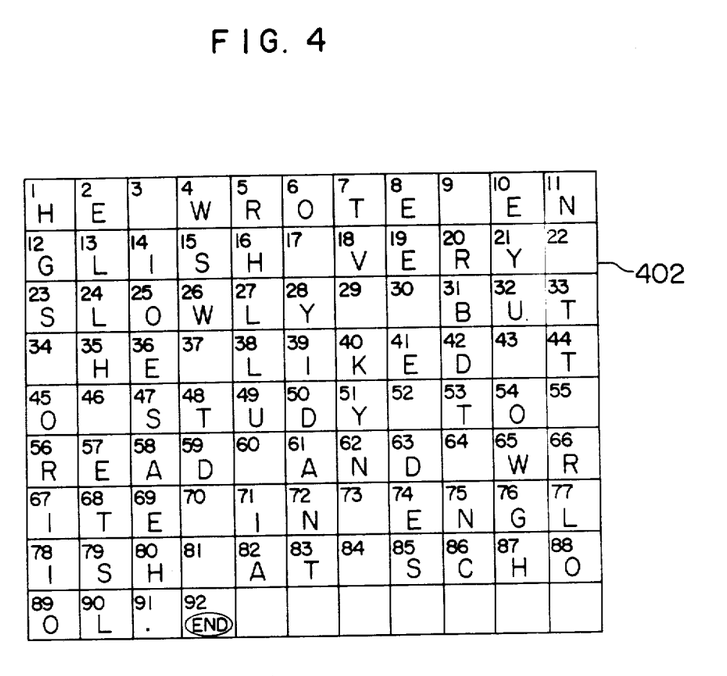
FIG. 4 shows an input text stream table.

FIG. 4 shows a text stream area 402 which is a portion of a working area of the memory 4, in which a text is stored by character. The text is segregated for each word by character spaces 3, 9, 17, 22 and a word stream table 403 shown in FIGS. 5A and 5B is formed in the memory 4.

Figure 5A:
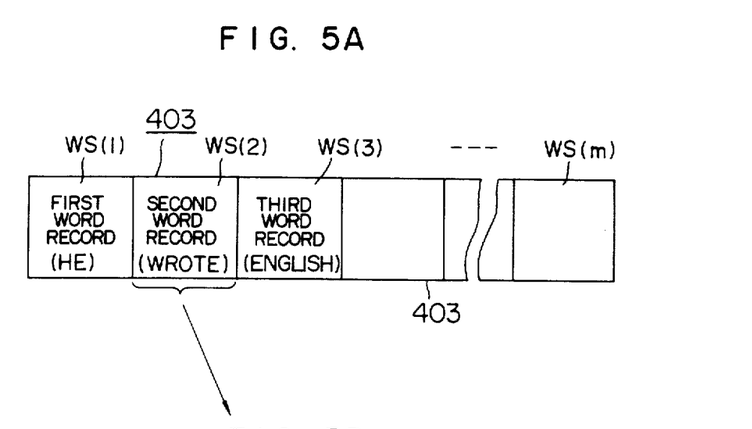
FIGS. 5A and 5B show contents of information stored in a word stream table of the present invention.
Figure 5B:
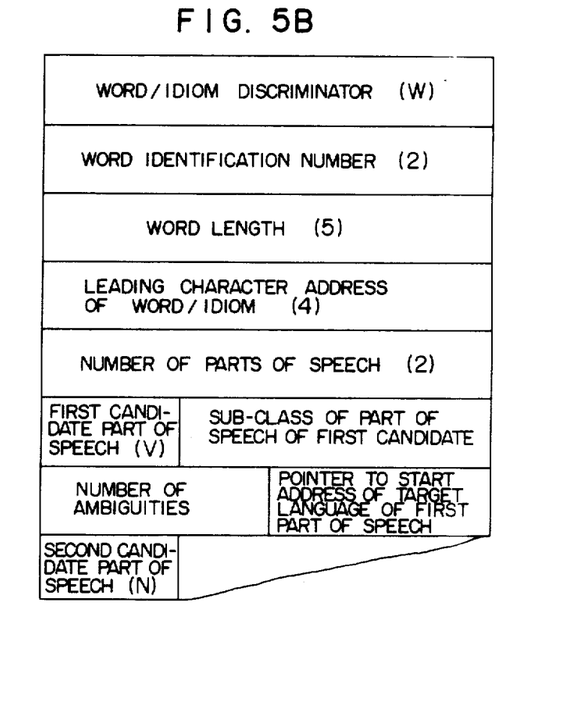

As seen from FIGS. 5A and 5B, each word or idiom contains a word record. Each word record contains information as shown in FIG. 5B. By way of example, the word record for the word "WROTE" is explained. A word/idiom discriminator includes information (W) indicating a word. A word identification number indicates an order number of appearance of the word. In the present example, (2) is written. The word length indicates the number of characters of the word or idiom. For "WROTE", (5) is written. A leading character address includes an address (4) of the leading character "W" of "WROTE" in the text stream table 402 (FIG. 4). A number of parts of speech includes (2) because "WROTE" is a verb (V) and a noun (N). The sub-class of the part of speech, the number of ambiguities and a pointer to a start address of a target language for each part of speech are written into the respective columns.

The words which constitute the word stream are analyzed for phrase structure based on a sequential relation of nodes of sentence construction.

The phrase structure analysis is a processing for segmenting phrasal elements from a part of speech string formed by assigning a single part of speech to each word or idiom of the English input text and a processing for generating a phrasal element part of speech string by assigning a new phrasal element part of speech. The phrasal element, unlike a concept of a phrase in conventional English grammer, means a minimum unit of a combination of words and/or idioms having a linguistical meaning. For example, noun+noun, subverb+verb, article+noun, adjective+noun and preposition+noun are phrasal elements.

Figure 6:
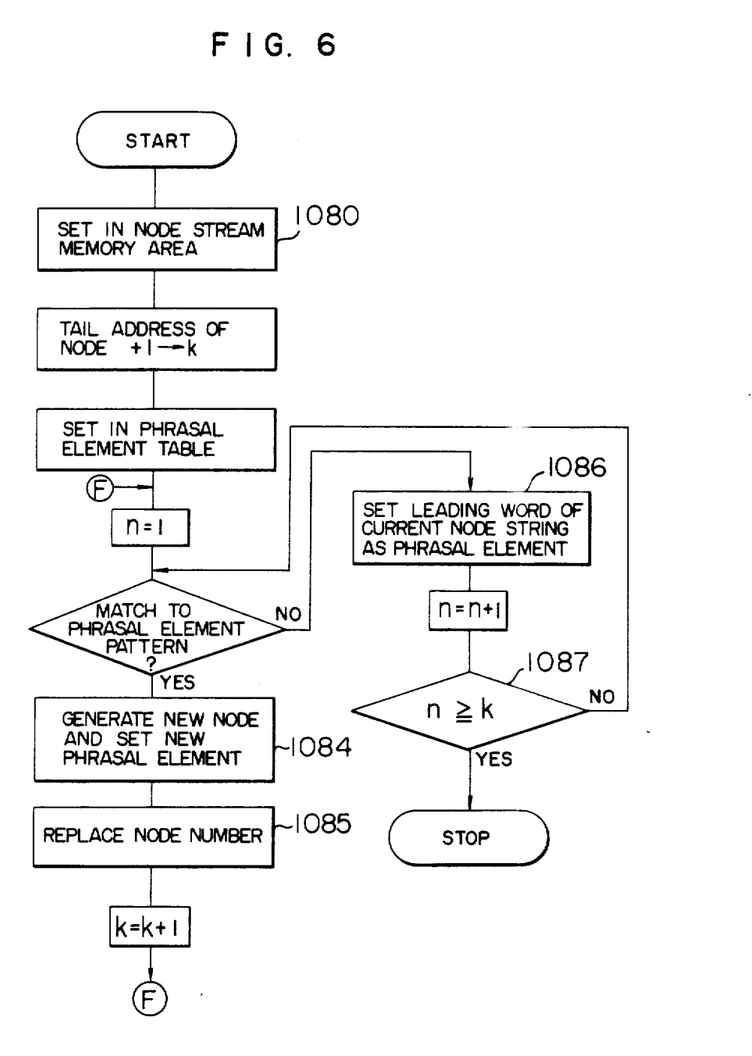
FIG. 6 illustrates a flow of processing of phase structure analysis in the present invention.
Figure 7:
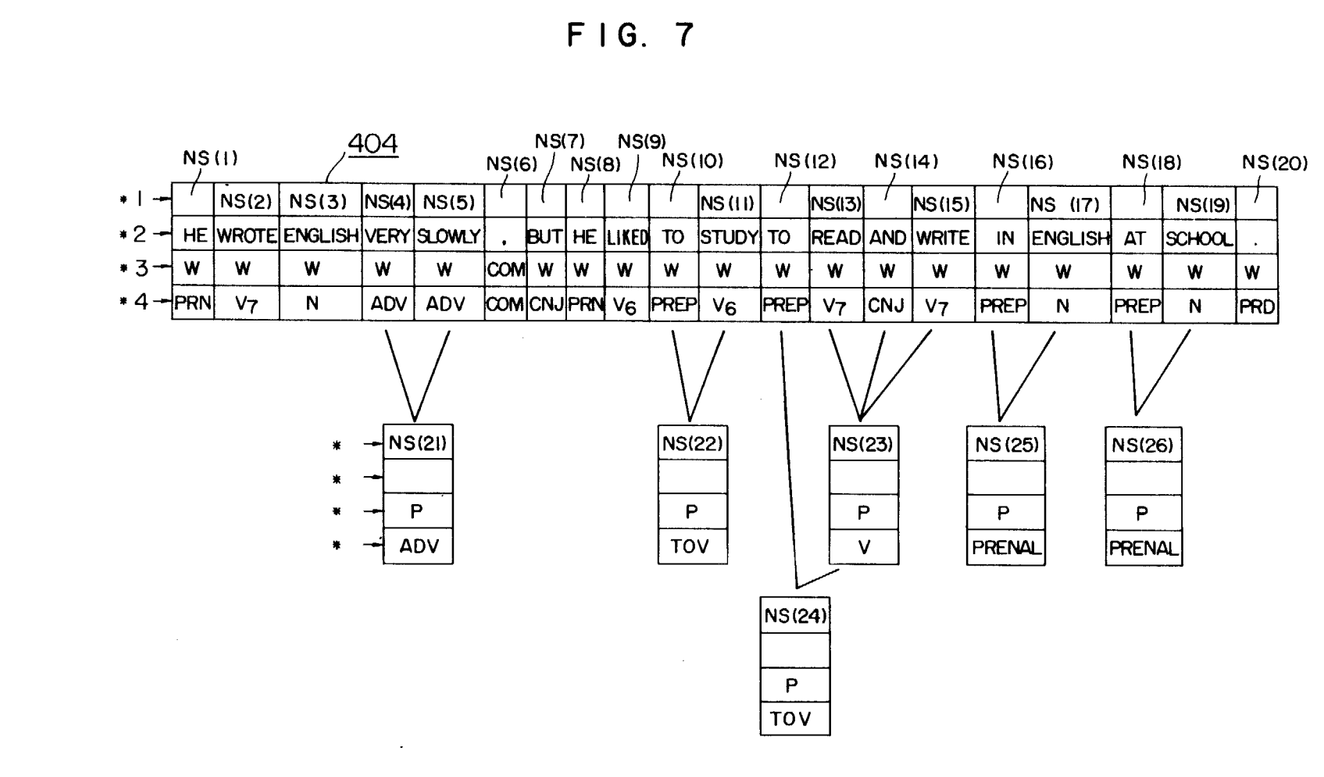
FIG. 7 illustrates a content of information stored in a node stream table of the present invention.

FIG. 6 shows a flow of processing of the phrase structure analysis. In a step 1080, the word records of the words/idioms in the word stream memory area 403 are set in a node stream memory area 404 (FIG. 7). FIG. 7 shows the word records thus set. NS(1), NS(2), . . . NS(20) in a line *1 are node numbers. Corresponding words are stored in a line *2. In actual use, information of the pointer to the word stream table (FIGS. 5A and 5B) is stored therein. Information representing a category of a node, that is, word (W), phrasal element (P), clause (C), quasi-clause (Q) or sentence (S) is stored in a line *3. Part of speech information and subclass of part of speech are stored in a line *4.

The phrasal elements are segmented based on the information stored in the node stream memory area 404.

In a step 1084, a string of nodes $NS(C_1)$, $NS(C_2)$, . . . which match with part of speech patterns of registered phrasal elements are combined to form a new node NS(k) and it is set in a phrasal element table.

Figure 8:
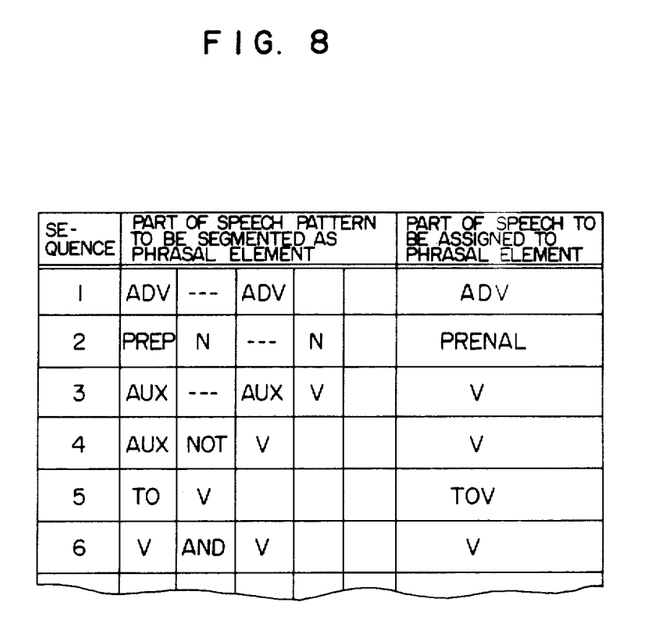
FIG. 8 shows an example of a pattern used for the phrase structure analysis of the present invention.

The newly generated node NS(k) is called a parent node. In the text shown in FIG. 7, NS(4) and NS(5) are combined to form a new node NS(21). The part of speech of the phrasal element of the node is an adverb (ADV) as looked up by a table of FIG. 8. A new node number is assigned to the newly formed parent node and the daughter node numbers are also registered. Thus, information is stored in the memory area for the node NS(21) representing that the node (21) is constructed by the nodes NS(4) and NS(5), the node is the phrasal element (P) and the part of speech of the phrasal element is adverb (ADV).

In a step 1085, the newly generated parent node is replaced by the daughter nodes to correct the phrasal element string table. The phrasal element string table originally contains the node numbers in the order of 1, 2, 3, 4, . . . 19, 20 and after the generation of the new phrasal element, the numbers are rearranged to 1, 2, 3, 21, 6, 7, 8, 9, 22, 24, 25, 26, 20 (see FIG. 7).

Next, an English sentence pattern analysis is conducted based on the above result. The English sentence pattern analysis is a process for combining a plurality of nodes NS(i) and classifying it to a predetermined English sentence pattern. The English sentence pattern recognition comprises a step of assigning a syntatic role to each node and discriminating a sentence, clause or quasi-clause based on a string of syntatic roles. The syntatic role indicates a function of the node in the phrasal element table, in the sentence, that is, whether it is a subject (SUBJ), a governor (GOV) or an object (OBJ).

The English sentence pattern analysis is now explained with reference to FIG. 9.

Figure 9:
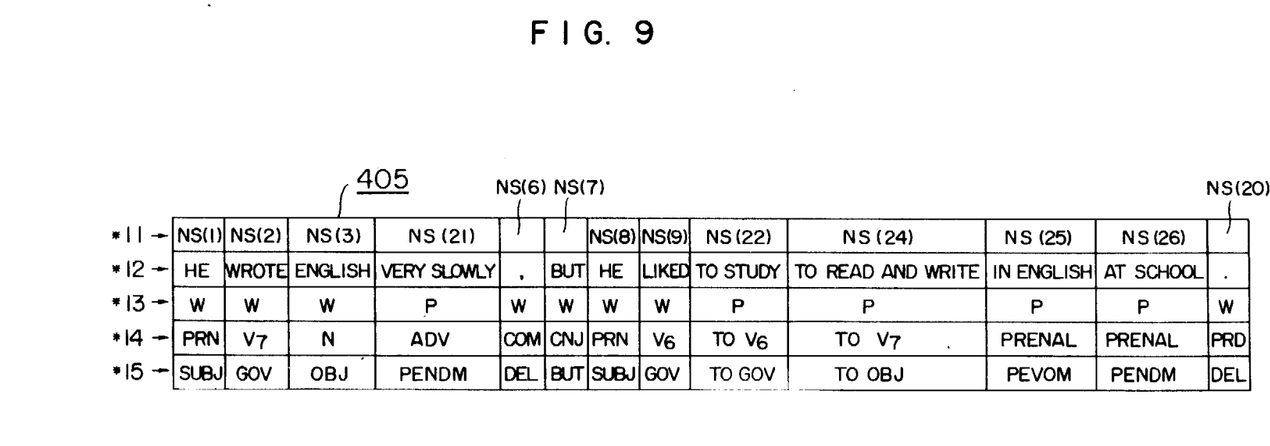
FIG. 9 shows a content of information stored in a phrasal element string table.

As a result of the phrase structure analysis, information is stored in the phrasal element string table memory area 405 as shown by lines *11, *12, *13 and *14 of FIG. 9. The line *11 stores the node number information. The line *12 stores the words or idioms corresponding to the nodes. In actual use, pointers to the node stream table are stored therein. The line *13 stores the category of the node, that is, the information representing word (W), phrasal element (P), clause (C), quasi-clause (Q) or sentence (S). The line *14 stores a part of speech of the word/idiom or a type number of the quasi-clause, clause or sentence. The line *15 stores a constructual operator obtained in the course of the English sentence pattern analysis.

Figure 10:
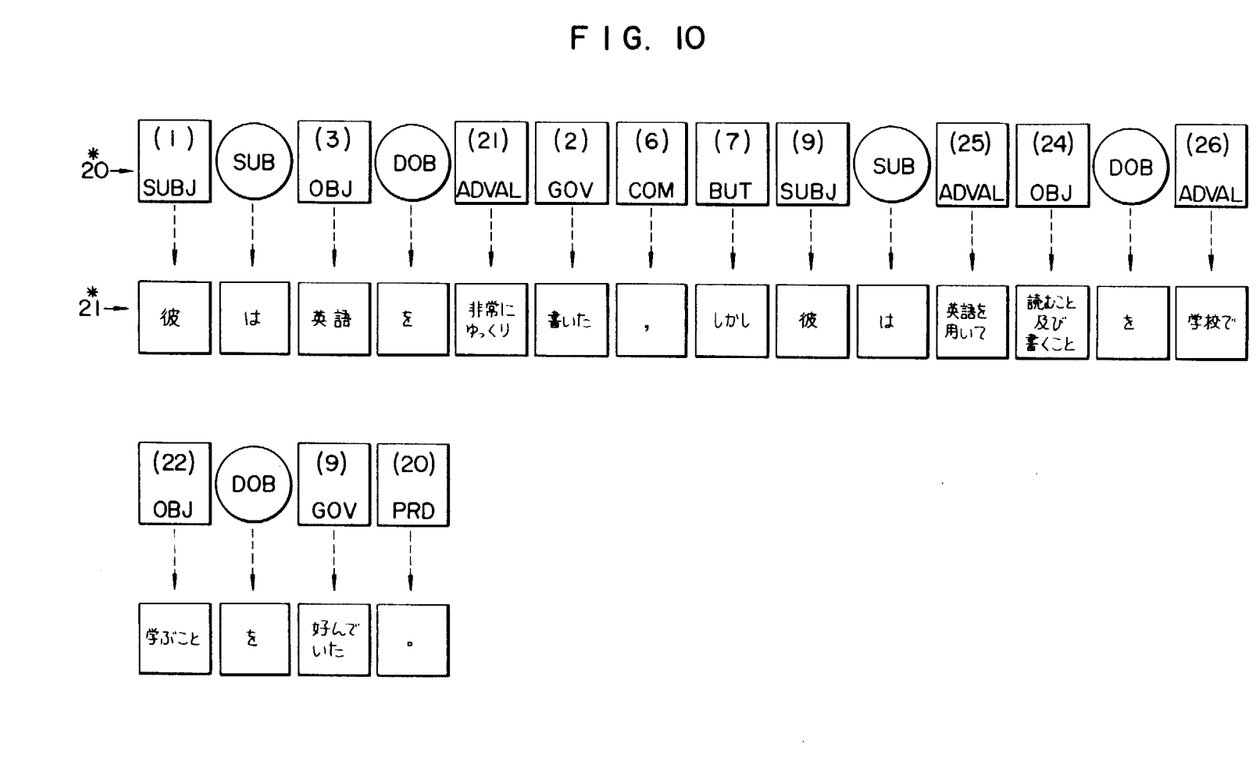
FIG. 10 shows an English text accompanied with a translated text.

The Japanese text generated by the nodes is stored in an output memory area as shown in FIG. 10.

A Japanese word is assigned to each of the nodes in the Japanese sentence pattern node string area shown in *20, and the Japanese words shown in *21 are stored in the output text table area.

FIG. 3 shows the Japanese text generated for the English text of FIG. 1 and stored in the memory 6.

Figure 11:
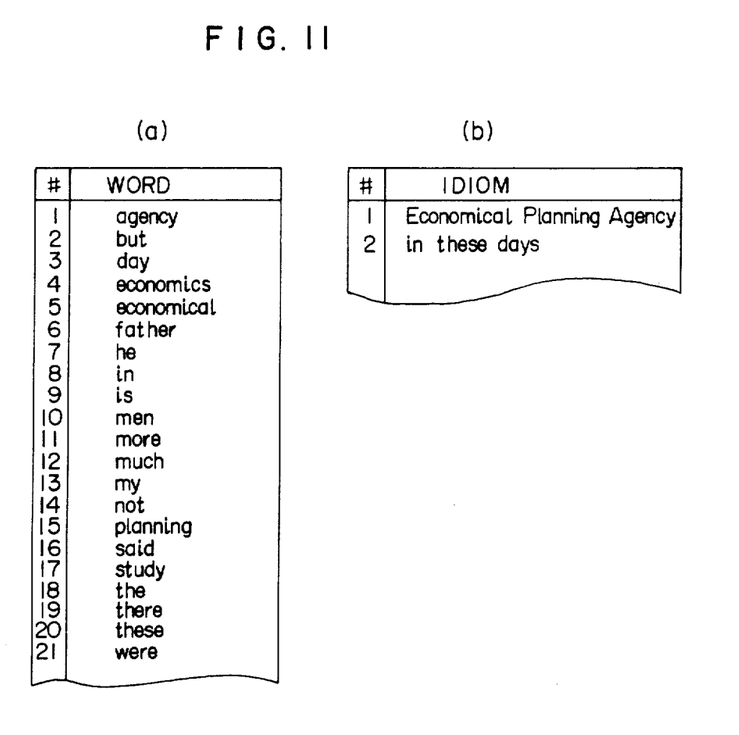
FIG. 11 shows a sorted table of words and idioms.

The circled numbers in the Japanese text indicate the order of sorting of words appearing in the English text corresponding to the Japanese text. The sorted table of the words corresponding to the English text of FIG. 3 is shown in FIG. 11a. In the arrangement, a word which appears more than once is not considered when it appears a second or subsequent time. An inflection word is changed to an original word when it is sorted. The sort processing is carried out in a word dictionary look-up processing which is one of the translation processing steps. It may be carried out by the dictionary look-up system disclosed in Japanese Patent Application No. 58-100798. Numbers in squares in the Japanese text indicate the order of sorting of idioms when the corresponding English text of the Japanese text immediately following the number is an idiom. The sorted table of the idioms corresponding to the English text of FIG. 3 is shown in FIG. 11b. The idiom sorted table is prepared by registering the idioms recognized in an idiom recognition process which is one of the translation processing steps, while inhibiting duplicate data in the sorted table.

The table information shown in FIG. 11 is prepared and utilized in the translation processing steps. It is not directly used in the present invention but it is explained here because it is reflected in the translated text. In the translated text, the circled numbers each comprise four bytes, that is "FφFφ" (two-byte hexadecimal data) representing a circle symbol and two-byte numeric data, and the squared numbers each comprises four bytes, that is, "φFφF" (two-byte hexadecimal data) representing a square symbol and two-byte numeric data.

As described above, the English text data information corresponding to the Japanese text is included in the Japanese text data for each unit of translation. However, the English text data information corresponding to those Japanese words having no definite corresponding English test data for example, particle "wa" or "ga" are not included.

An operation of the embodiment is now explained with reference to a processing chart of FIG. 12 and a processing flow of FIG. 13.

When the sentence key is designated by the keyboard 2, the processor 3 transfers the English text data and the Japanese text data shown in FIG. 3 from the external memory 6 to the memory 4 (101).

Then, the English test data is transferred from the memory 4 to the image buffer 5 (102). Then, the Japanese text data in the memory 4 excluding the circle symbols and the square symbols in FIG. 3, that is, the Japanese text data in the memory 4 excluding "FφFφ" + numeric data and "φFφF" + numeric data is transferred to the image buffers 5 (103). At this point, the display 1 displays as shown in FIG. 12a.

Then, various edit processings such as insertion, deletion, replacement, movement and copy are carried out by the keyboard 2 (104). The replacement which has a direct connection to the present invention is explained below.

Figure 12:
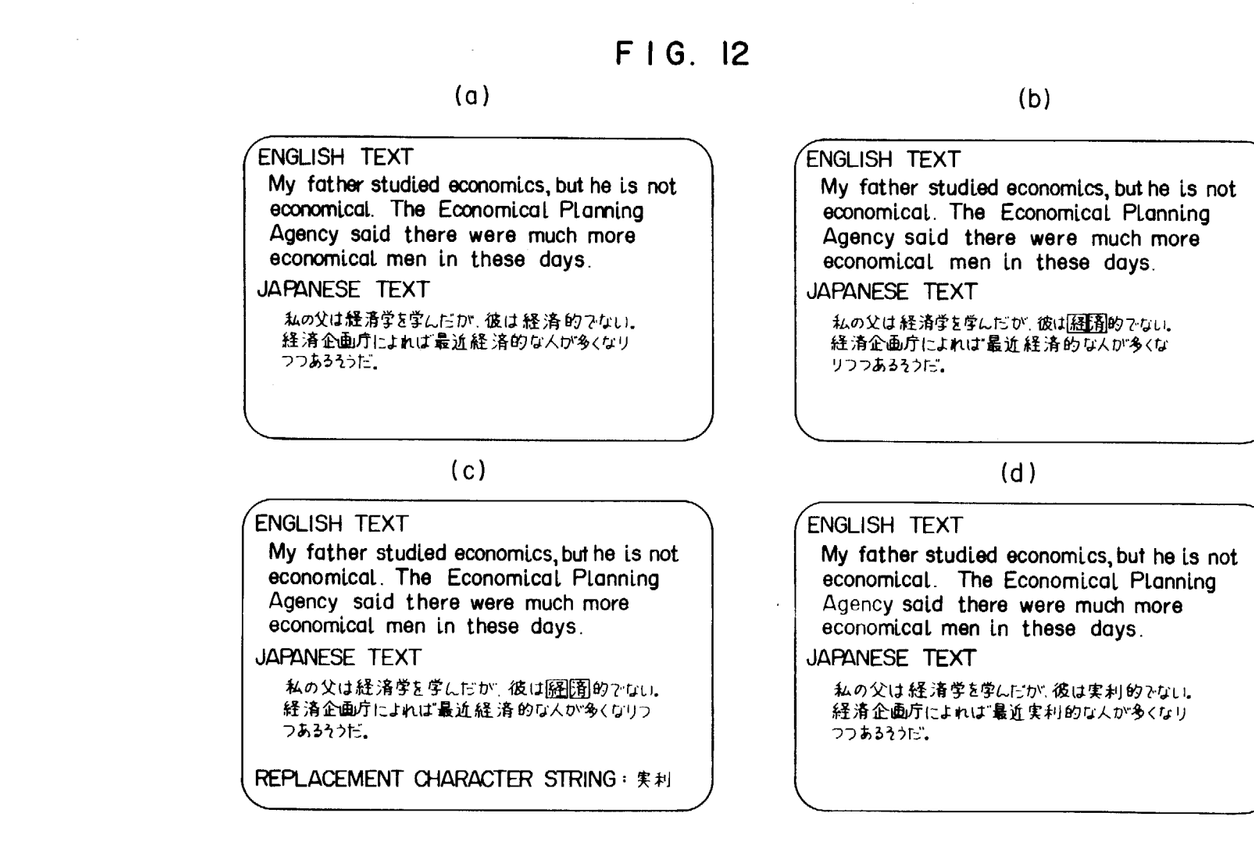
FIG. 12 illustrates processing in one embodiment of the present invention.
Figure 13A:
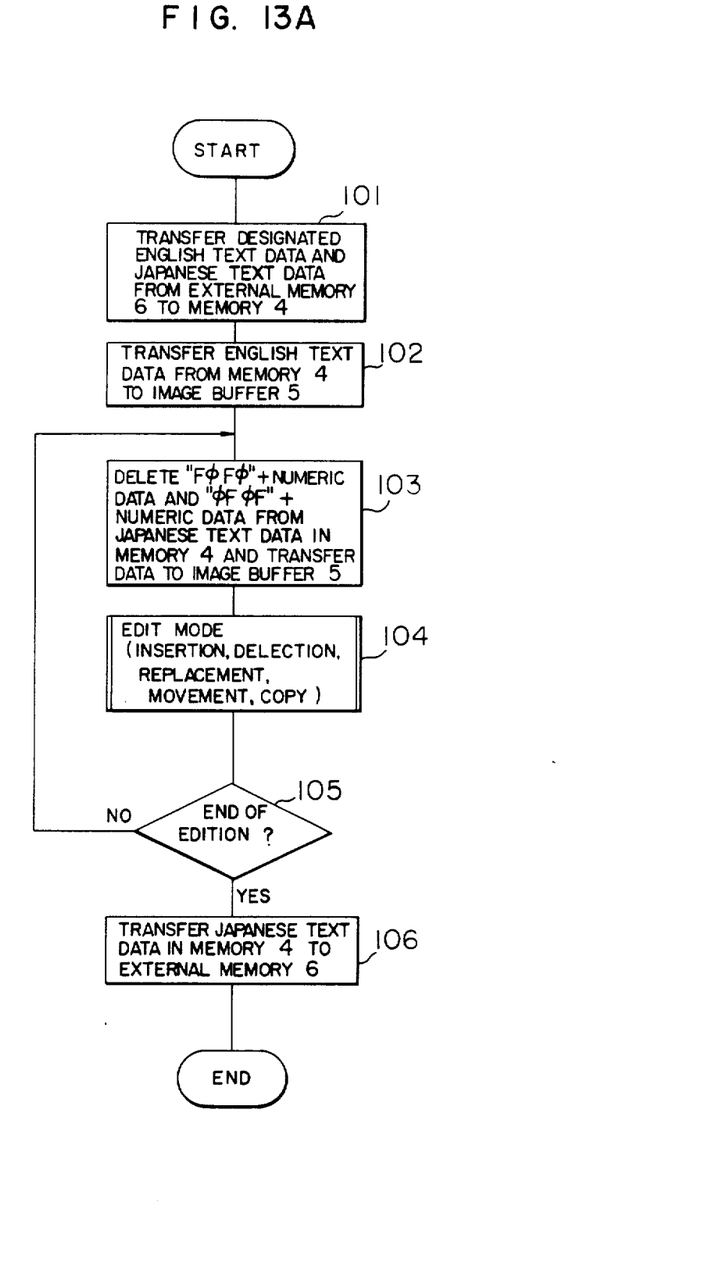
Figure 13B:
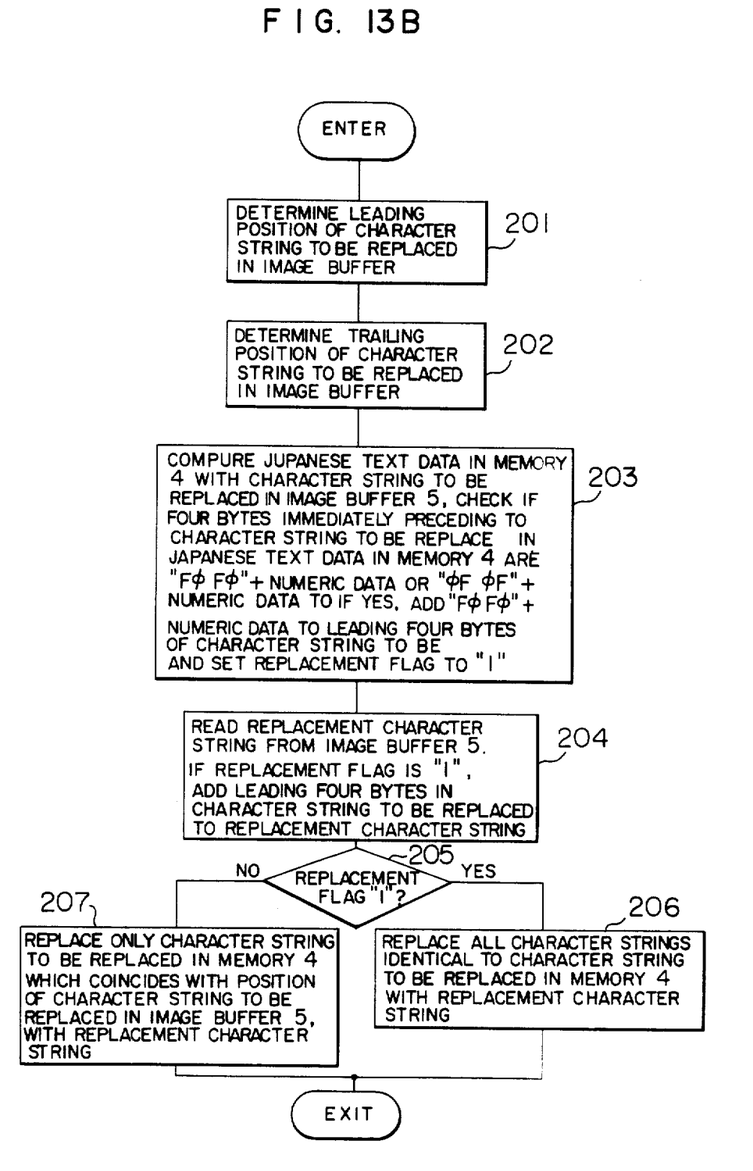

When the character string to be replaced in the Japanese text data on the display 1 is designated by the keyboard 2 as shown in FIG. 12b, the processor 3 extracts a leading position and a trailing position of the character string to be replaced, in the image buffer 5 (201 and 202).

Then, a leading position corresponding to the character string to be replaced, in the Japanese text data in the memory 4 (hereinafter referred to as a Japanese text physical data in order to distinguish it from the Japanese text data in the image buffer 5) corresponding to the Japanese text data in the image buffer 5 is determined. The Japanese text physical data is larger than the Japanese text data because the former includes the "F$\phi$F$\phi$" + numeric data and the "$\phi$F$\phi$F" + numeric data (hereinafter referred to as English correspondences). Accordingly, by skipping the four bytes corresponding to the English correspondence when the Japanese text physical data is scanned, the position coincident to the loading position of the character string to be replaced in the Japanese text data can be extracted. If the four bytes immediately preceding the position in the Japanese text physical data corresponding to the character string to be replaced are the English correspondence, a replacement flag is set to "1" and the four-byte English correspondence is added to the leading position of the character string to be replaced (203).

When the replacement character string is designated on the display 1 by the keyboard 2 as shown in FIG. 12c, the processor 3 extracts the replacement character string from the image buffer. If the replacement flag is "1", the same four-byte English correspondence as that of the leading four bytes of the character string to be replaced is added to the head of the replacement character string (204).

The processor 3 then checks the replacement flag (205), and if it is "1", it replaces all character strings in the Japanese text physical data in the memory 4 which are identical to the character string to be replaced, with the replacement character string (206). If the replacement flag is not "1", the processor replaces only one character string in the Japanese text physical data which corresponds to the character string to be replaced, with the replacement character string (207).

After the above replacement process, only the Japanese text word corresponding to non-idiom "economical" in the English text is changed from "経済(keizai)" to "実利(jitsuri)" (103).

The edition is further carried out (103). The insertion, deletion, movement and copy may be processed while maintaining the English correspondence in the Japanese text physical data as is done in the replacement process.

Those processing steps can be readily understood from the replacement process.

The Japanese text physical data thus edited is transferred to the external memory 6 and the editing process is terminated (106).

As described hereinabove, according to the present invention, the correspondence relation to the first language text is stored in the second language text for each unit of translation, and when the character strings in the second language text are replaced, not only the matching in the second language text is checked but also the matching in the first language text is checked. Accordingly, unnecessary replacement due to the matching of the characters can be prevented.

Since the data in the second language text which represents the correspondence relation with the first language text is maintained throughout the editing process, the repetitive editing process is allowed.

We claim:

1. A method of translating a text of a first language into a text of a second language, comprising:

a first step of providing individual identification numbers to words/idioms which appear in the text of said first language to identify the words/idioms, in accordance with a predetermined order by managing saidi words/idioms as data sorted in a table in which said words/idioms are arranged in accordance with said predetermined order with the same identification number being provided to the same word/idiom;

a second step of generating the text of said second language including said identification numbers as well as character strings of said second language corresponding to said words/idioms of said first language in which the identification numbers for the words/idioms of said first language corresponding to the character strings of said second language are appended as data of fixed length in correspondence with the respective character strings of said second language; and a third step of indicating the identification numbers appended to the character strings of the second language, so as to make it possible to trace the words/idioms of the first language using said identification numbers.

2. A method according to claim 1, further comprising a fourth step of revising said character strings of said second language in connection with the corresponding words/idioms of said first language on the basis of said identification numbers.

3. A method according to claim 1, wherein in said first step, identification signs indicating whether said words/idioms are words or idioms are provided together with said identification numbers to said words/idioms, and wherein in said second step, said identification signs are provided in connection with said identification numbers added to the respective character strings of said second language.

* * * * *